(12) United States Patent
Klutz

(10) Patent No.: US 8,662,426 B2
(45) Date of Patent: Mar. 4, 2014

(54) METHOD FOR PROCESSING BROWN COAL

(75) Inventor: Hans-Joachim Klutz, Otterdriesch (DE)

(73) Assignee: RWE Power Aktiengessellschaft, Essen (DE)

( * ) Notice: Subject to any disclaimer, the term of this patent is extended or adjusted under 35 U.S.C. 154(b) by 182 days.

(21) Appl. No.: 13/130,645

(22) PCT Filed: Nov. 24, 2008

(86) PCT No.: PCT/EP2008/009925
§ 371 (c)(1),
(2), (4) Date: Aug. 10, 2011

(87) PCT Pub. No.: WO2010/057512
PCT Pub. Date: May 27, 2010

(65) Prior Publication Data
US 2011/0283606 A1    Nov. 24, 2011

(51) Int. Cl.
*B02C 19/00* (2006.01)
(52) U.S. Cl.
USPC ............ 241/23; 44/598; 241/24.24; 241/29
(58) Field of Classification Search
USPC ............... 241/24.24, 24.31, 29, 23; 44/598
See application file for complete search history.

(56) References Cited

U.S. PATENT DOCUMENTS

| 4,615,712 A | 10/1986 | Wen |
| 2008/0041982 A1 | 2/2008 | Paulson et al. |

FOREIGN PATENT DOCUMENTS

| CN | 1030933 | 2/1989 |
| DE | 19618880 | 11/1997 |
| DE | 10150135 | 5/2003 |
| DE | 102006045042 | 4/2008 |
| GB | 358181 | 10/1931 |
| RU | 2010841 | 4/1994 |
| SU | 28278 | 11/1932 |
| SU | 140040 | 10/1961 |
| SU | 546646 | 2/1977 |

OTHER PUBLICATIONS

International Search Report dated Mar. 9, 2009 issued in related International Patent Application No. PCT/ EP2008/009925.
Written Opinion of the International Search Authority dated May 24, 2011 issued in related International Patent Application No. PCT/ EP2008/009925.
English Translation of International Preliminary Report on Patentability dated Jun. 30, 2011 issued in related International Patent Application No. PCT/EP2008/009925.

*Primary Examiner* — Mark Rosenbaum
(74) *Attorney, Agent, or Firm* — Grossman Tucker Perreault & Pfleger, PLLC

(57) ABSTRACT

The invention relates to a process for processing brown coal for combustion and/or gasification for the purpose of power generation, wherein the brown coal moist from the pit is firstly subjected to preliminary crushing and is subsequently comminuted. The milled coal is then fed to drying in a fluidized-bed dryer. The process is characterized in that the milling apparatus is followed by a control sieving facility, with the sieve opening being selected so that essentially 100% of the brown coal passes the sieve.

14 Claims, 2 Drawing Sheets

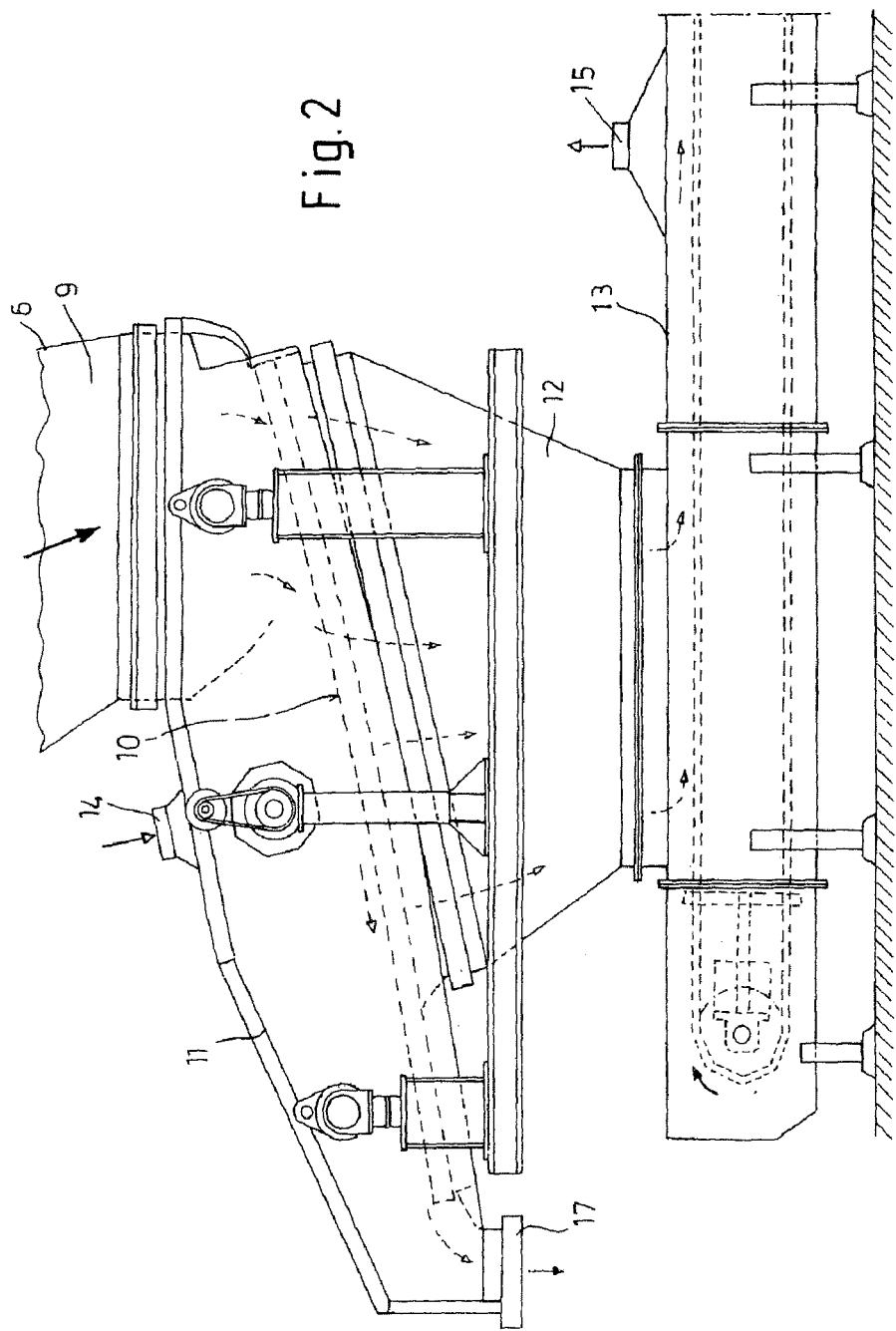

METHOD FOR PROCESSING BROWN COAL

The invention relates to a process for processing brown coal for combustion and/or gasification for the purpose of power generation, wherein the brown coil moist from the pit is firstly subjected to preliminary crushing and is subsequently comminuted in a milling apparatus and the milled coal is subsequently fed to a drying operation.

Such a process is known, for example, from 196 18 880 A1. In the process of DE 196 18 880 A1, the brown coal moist from the pit is firstly subjected to preliminary crushing to a particle size of about 50-150 mm. After preliminary crushing, removal of foreign bodies such as wood residues, proportions of xylite, pyrite contamination, metallic and nonmetallic foreign bodies, etc. is carried out. The removal of foreign bodies is followed by a multistage fine particle processing step. Here, a multistage fine milling with corresponding sieve classification, for example, is provided.

The processed fine particles are fed to a fluidized-bed dryer in which, due to the process, internal after-comminution of the brown coal inevitably occurs. Depending on the requirements of the boiler, after-sieving of the dry coal downstream of the dryer and after-milling of the oversize particles are carried out. It has been found to be particularly favorable in energy terms for the power station process for the comminuted raw brown coal to be dried in the above-described way in a fluidized-bed dryer and fed in dried form to the boiler. It is known that the efficiency of a power station can be increased, in particular compared to a conventional power station with milling-drying, by means of an energetically favorable separate predrying. It is important here to supply the dryer with a very uniform fine particle spectrum of brown coal, with the oversize particles preferably being relatively small in order to improve the heat transfer conditions in the fluidized-bed dryer. In addition, this ensures that good fluidization of the brown coal in the fluidized-bed dryer occurs even at a moderate fluidization velocity.

Moreover, experiments have shown that both proportions of wood in the coal and foreign materials in the coal can lead to considerable operating problems in fluidized-bed dryers which are equipped with comparatively densely packed heat exchangers and these problems considerably impair performance and efficiency of the process. Experiments have therefore been carried out with the aim of both making the preliminary comminution of the brown coal more effective and improving the foreign body removal immediately after the preliminary comminution.

It is therefore an object of the invention to improve a process of the type mentioned at the outset in respect of the removal of foreign materials and/or foreign bodies.

The object is achieved according to the invention by a process for processing brown coal for combustion and/or gasification for the purpose of power generation, wherein the brown coal moist from the pit is firstly subjected to preliminary crushing and is subsequently comminuted in a milling apparatus and the milled coal is subsequently fed to a drying operation, with the process being characterized in that means of removing foreign bodies from the material stream are installed immediately downstream of the milling apparatus.

The invention follows novel routes in respect of the removal of foreign bodies. Unlike the prior art, the invention provides for the removal of foreign bodies to follow milling. Although a certain proportion of foreign bodies and foreign materials would also be removed in after-sieving in the sense of a sieve classification, the after-sieving is usually carried out with a view to the desired separation step in such a way that the oversize particles are subjected to after-milling and the foreign materials removed would thus be circulated for at least some time. Finally, foreign bodies still getting into the mass stream during the processing of the fine coal cannot be ruled out. It has therefore been found to be particularly advantageous to subject the material stream leaving the milling apparatus to after-sieving with the sieve opening being selected so that essentially 100% of the brown coal passes the sieve. In this way, foreign bodies can be removed before any further, downstream sieve classification.

For the purposes of the invention, after-sieving is, as mentioned above, not sieve classification in the actual sense in which a particular separation cut within the particle size fraction is sought. Rather, in the after-sieving according to the invention, 100% of the brown coal is intended to pass the sieve, i.e. this after-sieving is a control sieving.

In the process of the invention, the brown coal is advantageously milled to an average particle size of 0-2 mm. The brown coal after milling is subjected to drying in a fluidized-bed dryer.

It is advantageous for the brown coal to be comminuted to an average particle diameter (D50) of not more than 1 mm.

The after-sieving is particularly preferably carried out using a sieve apparatus having a mesh opening of at least 4×6 mm, preferably from about 6×10 mm to about 10×15 mm. A variant of the process of the invention provides for the comminution of the brown coal to be carried out in two stages using two milling apparatuses arranged in series, with the after-sieving (control sieving) being carried out downstream of the second comminution stage.

The after-sieving can be carried out by means of at least one ventilated and/or heated vibratory sieve which is installed directly downstream of the mill discharge facility.

The vibratory sieve can be configured and arranged in such a way that it is matched to the geometry of the mill discharge facility.

The invention is illustrated below with the aid of an example depicted in the drawings.

In the drawings:

FIG. 2 shows part of the discharge facility of a coal mill with downstream vibratory sieve and downstream trough chain conveyor.

FIG. 1 shows only part of the boiler coal processing of brown coal for combustion in a boiler for steam generation.

Figure 1:
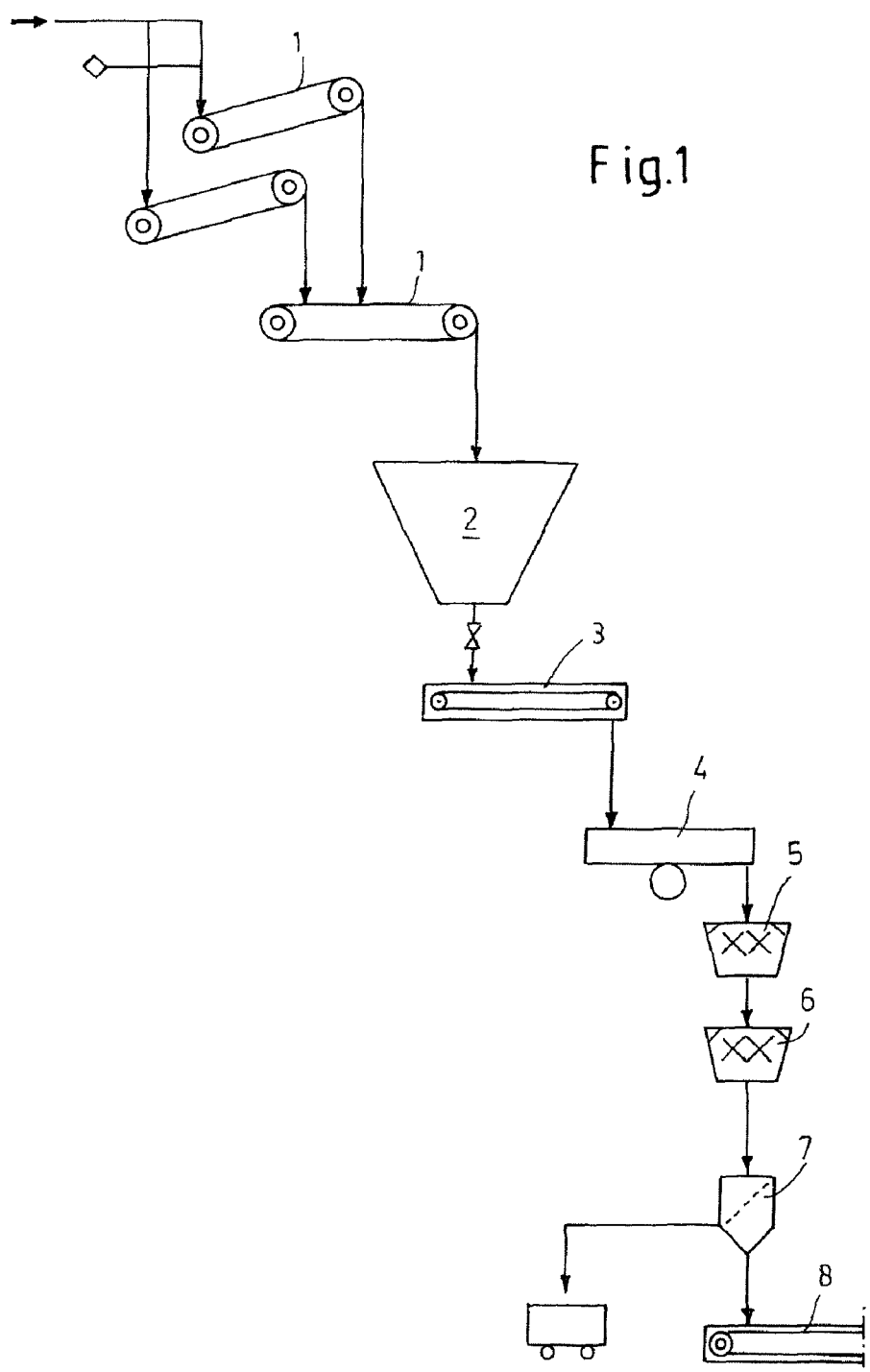
FIG. 1 shows part of the fine coal processing operation upstream of a fluidized-bed dryer, schematically as a flow diagram.

The raw brown coal having a water content of up to about 65% usually leaves the opencut mine with a maximum lump size of, for example, 300 mm. The raw coal supplied from the opencut mine is subjected to preliminary crushing by means of a crusher (not shown) to a particle size of, for example, 0-50 mm and fed via conveyor belts 1 to one or more raw coal hoppers 2. A foreign body removal for separating out foreign bodies such as metal parts or pieces of wood is provided both upstream of the crusher and downstream of the crusher. Relatively large amounts of more or less intermingled xylite are frequently also found in the raw coal.

It is useful and desirable to remove a very large proportion of foreign bodies and foreign materials including wood and xylite from the raw coal both before and after crushing.

The raw brown coal is conveyed from the raw coal hopper via a hopper offtake conveyor 3 and a downstream vibratory chute 4 to a first coal mill 5. The coal mill can, for example, be configured in a known way as hammer mill or impact mill. In the first coal mill 5, the brown coal is comminuted to, for example, a particle size in the range from 0 to 10 mm. The first coal mill 5 can be followed directly by a second coal mill 6.

The milled brown coal leaves the second coal mill 6 with an average particle size of, for example, 0-2 mm.

According to the invention, a control sieve 7 is installed directly downstream of the second coal mill 6. The material passing the control sieve 7 goes into a trough chain conveyor 8 which directly or indirectly supplies a fluidized-bed dryer (not shown). The oversize on the control sieve 7 is all discharged from the process.

The oversize on the control sieve 7 can additionally be subjected to a visual inspection in order to be able to remove, for example, wood and xylite from the process.

The wood and/or xylite are comminuted as fibrous materials, for example in a cutter mill, and reintroduced into the process in comminuted form.

The control sieve 7 is configured as a vibratory sieve having a comparatively large mesh opening of, for example, 6×10 mm, so that it is ensured that 100% of the output from the second coal mill 6, in so far as it is brown coal, goes through the sieve.

FIG. 2 shows the discharge chute 9 of the second coal mill 6 with the downstream apparatuses. The control sieve 7 is arranged in the form of a vibratory sieve directly under the discharge chute 9. The sieve bottom 10 of the control sieve 7 is arranged in a sieve housing 11 which is connected in an essentially gastight fashion to the discharge chute 9 of the coal mill 6. The sieve housing 11 is in turn connected by its discharge chute 12 to a trough chain conveyor denoted by 13.

The sieve housing 11 is heated by means of air. For this purpose, an air connection 14 via which the sieve housing 11 is flushed with gas through the discharge chute 12 in the trough chain conveyor 8 is provided. The heating and flushing of the sieve housing with air or flue gas serves to prevent caking of the fine coal within the sieve housing 11 and/or on the sieve bottom 10. The sieve housing can be operated at a subatmospheric pressure of 5-10 mbar. 15 denotes an air outlet on the housing of the trough chain conveyor 13.

The sieve housing 11 is provided with an open sieve outlet 17 via which the oversize on the sieve is taken off. The oversize on the sieve can, for example, be transported on a belt provided for this purpose or in a container provided for this purpose.

LIST OF REFERENCE NUMERALS

1) Conveyor belts
2) Raw coal hopper
3) Hopper offtake conveyor
4) Vibratory chute
5) First coal mill
6) Second coal mill
7) Control sieve
8) Trough chain conveyor
9) Discharge chute
10) Sieve bottom
11) Sieve housing
12) Discharge chute of the sieve housing
13) Trough chain conveyor
14) Air inlet of the sieve housing 11
15) Air outlet of the trough chain conveyor
16) Housing of the trough chain conveyor
17) Sieve outlet

What is claimed is:

1. A process for processing brown coal for combustion and/or gasification for the purpose of power generation, wherein the brown coal moist from a pit is firstly subjected to preliminary crushing and is subsequently comminuted in at least one milling apparatus and the milled brown coal is subsequently fed to a drying operation, characterized in that means of removing foreign bodies from a material stream of the brown coal are installed immediately downstream of the milling apparatus, wherein the foreign bodies are removed from the process after being comminuted in the at least one milling apparatus; and wherein the material stream leaving the milling apparatus is subjected to after-sieving to remove the foreign bodies, with a sieve having a sieve opening such that essentially 100% of the brown coal passes the sieve.

2. The process as claimed in claim 1, characterized in that the brown coal is milled to an average particle size of 0-2 mm.

3. The process as claimed in claim 1, characterized in that the brown coal after milling is subjected to drying in a fluidized-bed dryer.

4. The process as claimed in claim 1, characterized in that the after-sieving is carried out using a sieve apparatus having a mesh opening of at least 4×6 mm.

5. The process as claimed in claim 4, characterized in that the sieve apparatus has a mesh opening of about 6×10 mm to about 10×15 mm.

6. The process as claimed in claim 1, characterized in that the at least one milling apparatus comprises two milling apparatuses and the comminution of the brown coal is carried out in two stages using the two milling apparatuses arranged in series, with the after-sieving being carried out downstream of the second comminution stage.

7. The process as claimed in claim 6, characterized in that a first milling apparatus comminutes the brown coal to a particle size of 0-10 mm and a second milling apparatus comminutes the brown coal to a particle size of 0-2 mm.

8. The process as claimed in claim 1, characterized in that the after-sieving is carried out by means of at least one ventilated and/or heated vibratory sieve which is installed directly downstream of the at least one milling apparatus.

9. The process as claimed in claim 8, characterized in that the at least one ventilated and/or heated vibratory sieve is connected to a discharge chute of the at least one milling apparatus to receive the material stream from the milling apparatus.

10. The process as claimed in claim 9, characterized in that a conveyor is connected to a discharge chute of the sieve to receive the material stream from the sieve.

11. The process as claimed in claim 10, characterized in that the conveyor feeds the material stream to the drying operation.

12. The process as claimed in claim 1, characterized in that the sieve is operable at a subatmospheric pressure of 5-10 mbar.

13. The process as claimed in claim 1, characterized in that the foreign bodies comprise at least one of wood, metal and xylite.

14. The process as claimed in claim 1, characterized in that the after-sieving removes the foreign bodies before a downstream sieve classification.

* * * * *